US006958031B2

(12) United States Patent
Diosi et al.

(10) Patent No.: US 6,958,031 B2
(45) Date of Patent: Oct. 25, 2005

(54) AUTOMATICALLY SHIFTABLE MOTOR VEHICLE TRANSMISSION

(75) Inventors: Gabor Diosi, Friedrichshafen (DE); Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/633,324

(22) Filed: Aug. 1, 2003

(65) Prior Publication Data

US 2005/0026738 A1 Feb. 3, 2005

(51) Int. Cl.[7] .................................................. F16H 3/62
(52) U.S. Cl. ........................ 475/276; 475/277; 475/280
(58) Field of Search ................................ 475/275–278, 475/280, 296

(56) References Cited

U.S. PATENT DOCUMENTS

| | | | | |
|---|---|---|---|---|
| 3,956,946 A | * | 5/1976 | Murakami et al. | 475/276 |
| 4,070,927 A | | 1/1978 | Polak | 74/765 |
| 5,165,308 A | * | 11/1992 | Asada et al. | 475/276 X |
| 6,053,839 A | | 4/2000 | Baldwin et al. | |
| 6,808,469 B2 | * | 10/2004 | Tabata et al. | 475/276 |
| 6,811,513 B1 | | 11/2004 | Filanovsky et al. | |
| 2004/0116237 A1 | | 6/2004 | Martyka et al. | |

FOREIGN PATENT DOCUMENTS

| | | | | |
|---|---|---|---|---|
| DE | 29 39 623 B | | 12/1980 | |
| DE | 199 12 480 A1 | | 9/2000 | F16H/3/62 |
| DE | 101 62 883 | | 7/2003 | |
| EP | 0 434 525 B1 | | 6/1991 | F16H/3/66 |
| EP | 1 265 006 A2 | | 12/2002 | F16H/3/66 |
| GB | 1 522 616 A | | 8/1978 | |
| JP | 02154846 | | 6/1990 | |
| JP | 2-154846 | * | 6/1990 | 475/276 |

OTHER PUBLICATIONS

Lei Tian et al.; "Matrix System for the Analysis of Planetary Transmission" Journal of Mechanical Design, Feb. 1, 2000. XP002287733.

Krstich A M: "Types of Kinematic Connections of Two Simple Planetary Three Gear Trains" Internatioanl Journal of Vehicle Design, St. Helier, GB, BD. 11, NR. 3, 1990, Seiten 314–321, XP008032692.

Nadel B A et al: "Automobile Transmission Design as a Constraint Satisfaction problem: First Results" Proceedings of the Conference on Artificial Intelligence Application. Miami Beach, Feb. 24–28, 1991, New York, IEEE, US, Bd. vol. 2 Conf. 7, 24 Feb., 1991, Seiten 248–256, EP010022615.

Nadel B A et al: "Automobile Transmission Design as a Constraint Satifaction Problem: Modelling the Kinematic Level" Artificial Intelligence for Engineering Design, Analysis and Manufacturing, London, GB, Bd. 5, Nr. 3, 1991, Seiten 137–171, EP008032722.

* cited by examiner

*Primary Examiner*—Ha Ho
(74) *Attorney, Agent, or Firm*—Davis & Bujold, P.L.L.C.

(57) ABSTRACT

A motor vehicle transmission having seven forward speeds and one reverse gear containing an input drive shaft (1) and an output drive shaft (2) that are arranged in a housing (G); three single-carrier planetary gear sets (P1, P2, P3); six rotatable shafts (1, 2, 3, 4, 5, 6); and six shifting elements (03, 04, 05, 14, 15, 45, 24), encompassing brakes (03, 04, 05) and clutches (14, 15, 24, 45); the input drive shaft (1) being continuously connected to the sun gear of the second planetary gear set (P2) and being connectable via a clutch (14) to the carrier of the first planetary gear set (P1) and being connectable via a clutch (15) to the shaft (5) which on the one hand is continuously connected to the sun gear of the first planetary gear set (P1) and on the other hand is couplable via a brake (05) to the housing (G); the output drive shaft (2) being continuously connected to the carrier of the third planetary gear set (P3) and to the ring gear of the first planetary gear set (P1).

35 Claims, 3 Drawing Sheets

| Spacing | 1.75 | 1.26 | 1.31 | 1.38 | 1.37 | 1.28 | Spread | 7 |
|---|---|---|---|---|---|---|---|---|
| Speed | 5.47 | 3.13 | 2.48 | 1.90 | 1.37 | 1.00 | 0.78 | -3.6 |
| SE/Gg | 1 | 2 | 3 | 4 | 5 | 6 | 7 | RI |
| 03 | X | X | X | X | X | | | |
| 04 | X | | | | | | | X |
| 05 | | X | | | | | X | |
| 14 | | | | | X | X | X | |
| 15 | | | | X | | X | | X |
| 45 | | | X | | | | | |

| Spacing | 1.75 | 1.26 | 1.31 | 1.38 | 1.37 | 1.28 | Spread | 7 |
|---|---|---|---|---|---|---|---|---|
| Speed | 5.47 | 3.13 | 2.48 | 1.90 | 1.37 | 1.00 | 0.78 | -3.6 |
| SE/Gg | 1 | 2 | 3 | 4 | 5 | 6 | 7 | R1 |
| 03 | X | X | X | X | X | | | |
| 04 | X | | | | | | | X |
| 05 | | X | | | | | X | |
| 14 | | | | | X | X | X | |
| 15 | | | | X | | X | | X |
| 24 | | | X | | | | | |

AUTOMATICALLY SHIFTABLE MOTOR VEHICLE TRANSMISSION

FIELD OF THE INVENTION

The present invention concerns an automatically shiftable motor vehicle transmission of planetary design.

BACKGROUND OF THE INVENTION

According to the existing art, automatic transmissions, in particular for motor vehicles, usually encompass planetary gear sets that are shifted by means of frictional or shifting elements, for example clutches and brakes, and usually are connected to a initial movement element, for example a hydrodynamic torque converter or a fluid coupling, that is based on a slip effect and is selectably equipped with a lockup clutch.

A transmission of this kind is disclosed in EP 0 434 525 B1. It substantially encompasses an input drive shaft and an output drive shaft that are arranged parallel to one another; a double planetary gear set arranged concentrically with the output drive shaft; and five shifting elements in the form of three clutches and two brakes, the selectable locking of which, in respective pairs, determines the various gear ratios between the input drive shaft and output drive shaft. The transmission has a reduction gear set and two power paths, so that by selective paired engagement of the five shifting elements, six forward speeds are obtained.

For the first power path, two clutches are needed in order to transfer torque from the reduction gear set to two elements of the double planetary gear set. These are arranged in the power flow direction substantially after the reduction gear set in the direction of the double planetary gear set. For the second power path, a further clutch is provided that releasably connects it to a further element of the double planetary gear set. The clutches are arranged in such a way that the inner disc carrier constitutes the output drive.

A further planetary transmission of this kind is known, for example, from U.S. Pat. No. 4,070,927, the number of available forward gears being in each case one greater than the number of frictional or shifting elements. Each gear change between the forward gears is achieved by respectively switching one of the frictional or shifting elements in or out.

Also known, from DE 199 12 480 A1 of the present inventor, is an automatically shiftable motor vehicle transmission having three single-carrier planetary gear sets as well as three brakes and two clutches for selecting six forward gears and one reverse gear, in which the input drive shaft is connected directly to the sun gear of the second planetary gear set and is connectable via the first clutch to the sun gear of the first planetary gear set and/or via the second clutch to the carrier of the first planetary gear set. Additionally or alternatively, the sun gear of the first planetary gear set is connectable via the first brake to the housing of the transmission, and/or the carrier of the first planetary gear set is connectable via the second brake to the housing, and/or the sun gear of the third planetary gear set is connectable via the third brake to the housing.

Also described in EP 1 265 006 A2 is a six-speed automatic transmission of planetary design which also encompasses two brakes and two clutches, in which the individual gear ratios can be implemented by a combination of two shifting elements in each case.

Automatically shiftable vehicle transmissions of planetary design in general have already been described many times in the existing art, and are continuously being developed and improved. For example, these transmissions are intended to have a sufficient number of forward speeds as well as a reverse gear, as well as a conversion ratio that is highly suitable for motor vehicles, with a wide overall ratio spread and favorably spaced ratios. They should also make possible a high initial movement conversion ratio in the forward direction and contain a direct ratio, and be suitable for use in both passenger cars and commercial vehicles. These transmissions should also require little design complexity, in particular a small number of shifting elements; and should prevent double shifts upon sequential shifting, so that when shifts are made in defined speed groups, only one shifting element is changed in each case.

Transmissions of the kind described above generally have six forward speeds; a further, seventh speed would advantageously result in more convenience for the driver and in optimized fuel consumption. The seventh gear also optimally guarantees a sporty driving style.

It is the object of the present invention to propose a multiple-ratio transmission of the kind described above in which at least seven forward speeds can be implemented. It is intended, in the multiple-ratio transmission according to the present invention, that low torques act on the shifting elements and planetary gear sets; and that the rotation speeds of the shafts, shifting elements and planetary gear sets be minimized. The transmission according to the present invention is furthermore intended to be light in weight with compact dimensions. Any desired embodiment and arrangement of an initial movement element, and of the input drive and output drives, should also be possible.

At this point, and before entering the following descriptions, it must be noted that certain of the following descriptions refer to “minus transmissions” or “minus planetary transmission”, which are also commonly referred to in the relevant arts as “planetary-minus-gear sets”, and to “plus transmissions” or “plus planetary transmissions”, which are also commonly referred to as “plus-planetary-gear sets”. Although these terms are well known and commonly used terms of art in the relevant arts, a brief description of these terms will assist in understanding the full meaning of the following descriptions. In brief a planetary gearset or transmission is a planetary-minus-gear set or a planetary-plus-gear set when the planetary carrier is fixed and the sun gear is driven by an input speed in a defined direction of rotation. If the ring gear rotates, as a result of the sun gear rotation, in the same direction as the sun gear, then the planetary gear set is referred to as a planetary-plus-gear set or a plus-transmission. If the ring gear rotates, as a result of the sun gear rotation, in the direction opposite to the rotation of the sun gear, then the planetary gear set is referred to as a planetary-minus-gear set or a minus-transmission. In a typical implementation of a minus-transmission or a plus-transmission and, for example, the transmission or gear set is a double pinion type planetary gear set having a sun gear, a ring gear and two sets of planetary pinions wherein the first set of planetary pinions intermesh with the sun gear and the second set of planetary pinions while the second set of planetary pinions intermesh with the first set of planetary pinions and the ring gear. The terms, therefore, effectively describe a single pinion type planetary gear set having a sun gear, a ring gear and only one set of planetary pinions. It is well known, however, that there are several other types of planetary gear sets that can be referred to as a “planetary-plus-gear set” or a “planetary-minus-gear set. For example, a planetary gear set having a single sun gear, a single ring gear and an odd number of planetary pinion sets may be referred to as a "minus-transmission", while a similar gear set having, however, an even number of planetary pinion sets, may be referred to as a "plus-transmission".

SUMMARY OF THE INVENTION

In accordance therewith, an automatically shiftable multiple-ratio transmission of planetary design is proposed, encompassing an input drive shaft and an output drive shaft that are arranged in a housing; three single-carrier planetary gear sets; at least six rotatable shafts; and at least six shifting elements, preferably encompassing three brakes and three clutches, selective engagement of which (in pairs) brings about various conversion ratios between the input drive shaft and output drive shaft, so that at least seven forward speeds and at least one reverse gear can be implemented, in which the input drive shaft is continuously connected to the sun gear of the second planetary gear set, is connectable via a clutch to the carrier of the first planetary gear set, and is connectable via a further clutch to a fifth shaft which on the one hand is continuously connected to the sun gear of the first planetary gear set and on the other hand is couplable via a brake to the housing. In addition, the output drive shaft is continuously connected to the carrier of the third planetary gear set and to the ring gear of the first planetary gear set, a further third shaft being continuously connected to the sun gear of the third planetary gear set and couplable by way of a brake to the housing.

Furthermore, according to the present invention, a further, fourth shaft is continuously connected to the ring gear of the second planetary gear set and to the carrier of the first planetary gear set, and is couplable via a brake to the housing; a further, sixth shaft is continuously connected to the ring gear of the third planetary gear set and to the carrier of the second planetary gear set. According to the present invention, a further clutch is provided which releasably interconnects the fourth shaft to the output drive shaft or to the fifth shaft. The single-carrier planetary gear sets are preferably embodied as minus planetary gear sets.

The configuration according to the present invention of the multiple-ratio transmission results in suitable conversion ratios as well as a considerable increase, as compared with the existing art, in the overall ratio spread of the multiple-ratio transmission; this brings about an improved adaptation, over the entire operating range of the motor vehicle, of the gear ratios to the respective rotational speeds of the drive engine to which the multiple-ratio transmission is connected, with the consequence of improved drivability of the motor vehicle and a significant decrease in fuel consumption. Comparatively favorably spaced ratios and a high initial movement conversion ratio in the forward direction can moreover be achieved.

The multiple-ratio transmission according to the present invention is suitable for any motor vehicle, in particular for passenger cars and for commercial vehicles, e.g., trucks, buses, construction vehicles, rail vehicles, tracked vehicles, and the like.

With the multiple-ratio transmission according to the present invention the design complexity is moreover considerably reduced as a result of a small number of shifting elements, preferably three clutches and three brakes. With the multiple-ratio transmission according to the present invention it is advantageously possible to perform an initial movement using a hydrodynamic converter, an external initial movement clutch, or also other suitable external initial movement elements. It is also conceivable to enable an initial movement operation using an initial movement element integrated into the transmission.

According to the present invention, one gear, preferably the sixth gear, can be designed as a direct ratio; double shifts and group shifts upon sequential shifting are moreover avoided.

The input drive shaft and output drive shaft can be arranged both coaxially with one another on opposite sides, and also both on the same side, of the transmission housing. It is also possible to arrange the output drive between the planetary gear sets and the clutches.

BRIEF DESCRIPTION OF THE DRAWINGS

The invention will now be described, by way of example, with reference to the accompanying drawings in which.

DETAILED DESCRIPTION OF THE INVENTION

Figures 1, 2:
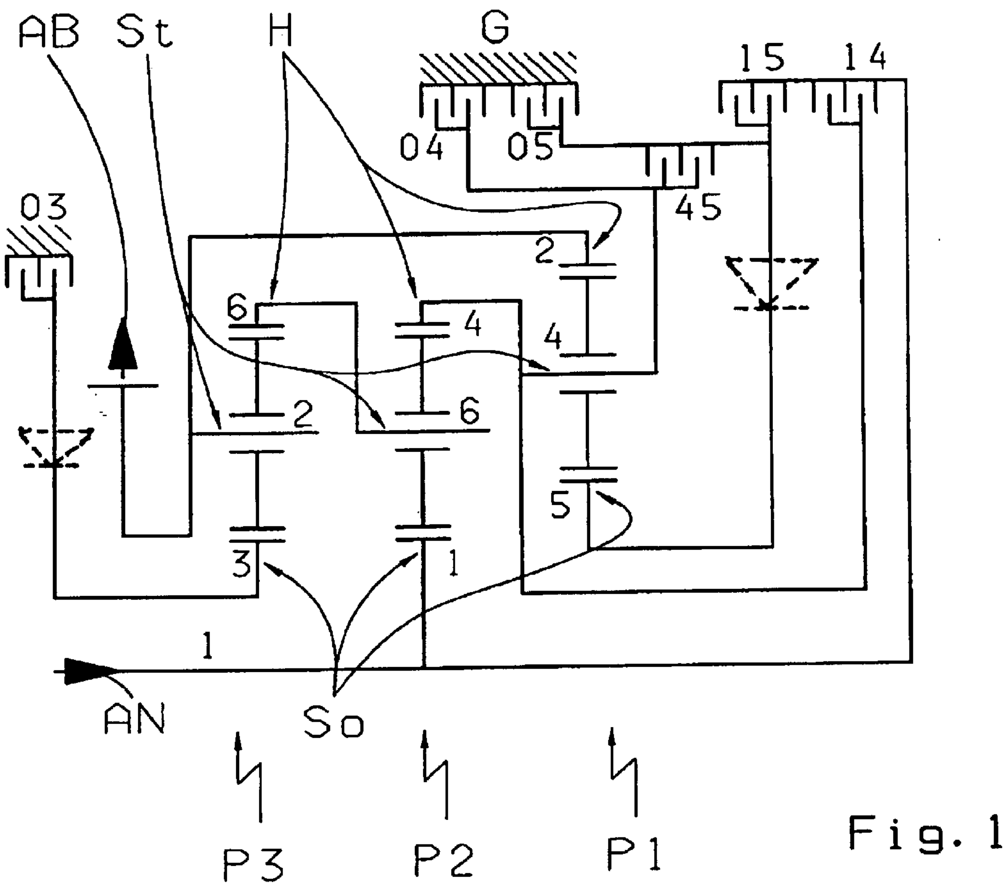
FIG. 1 is schematically depicts a first embodiment of a transmission according to the present invention.
FIG. 2 shows, by way of example, a shifting diagram for the transmission depicted in FIG. 1.

Identical components in different Figures, or components having identical functions, area labeled in the Figures with the same reference characters.

A transmission according to the present invention substantially encompasses, according to FIG. 1, three single-carrier planetary gear sets P1, P2, P3 embodied: as minus planetary gear sets; six rotatable shafts 1, 2, 3, 4, 5, 6; three brakes 03, 04, 05; and three clutches 14, 15, 45. All these components are arranged inside a housing G. Planetary gear sets P1, P2, P3 each comprise a sun gear, a carrier with planetary gears, and a ring gear. The three planetary gear sets P1, P2, P3 are arranged coaxially with one another, the middle planetary gear set (viewed three-dimensionally) being labeled P2. In the context of the exemplary embodiment shown in FIG. 1, the planetary gear sets are connected to one another as set forth below.

Input drive shaft 1 is continuously connected to the sun gear of second planetary gear set P2, and is connectable via a clutch 14 to the carrier of first planetary gear set P1; input drive shaft 1 is furthermore connectable via a further clutch 15 to shaft 5, which on the one hand is continuously connected to the sun gear of first planetary gear set P1 and on the other hand is couplable via a brake 05 to housing G. Output drive shaft 2 is continuously connected to the carrier of third planetary gear set P3 and to the ring gear of first planetary gear set P1, and a further shaft 3 is continuously connected to the sun gear of third planetary gear set P3 and couplable via a brake 03 to housing G. A further shaft 4 is continuously connected to the ring gear of second planetary gear set P2 and to the carrier of first planetary gear set P1, and is couplable via a brake 04 to housing G. Shaft 6 is furthermore continuously connected to the ring gear of third planetary gear set P3 and to the carrier of second planetary gear set P2. According to the invention, a clutch 45 is provided which releasably connects shaft 4 to shaft 5. Seven forward speeds are implemented by the provision of this internal clutch.

Shaft 4 is releasably connected, in a region between brake 04 and the carrier of first planetary gear set P1, to shaft 5 via clutch 45.

FIG. 2 depicts a shifting diagram of the multiple-ratio transmission according to the present invention shown in FIG. 1. The shifting diagram illustrates, by way of example, the respective conversion ratios i of the individual gear ratios, and the ratio intervals to be determined therefrom. It is also evident from the shifting diagram that double shifts or group shifts can be avoided in the context of sequential shifting because each two adjacent gear ratios use a common shifting element. As is apparent from the shifting diagram, it is also possible to skip gears without group shifting. The sixth gear is preferably embodied as a direct ratio.

For the first five speeds, brake 03 is continuously activated; in addition, brake 04 is closed for first gear, brake 05 for second gear, clutch 45 for third gear, clutch 15 for fourth gear, and clutch 14 for fifth gear. Clutches 14 and 15 must be closed for sixth gear, and clutch 14 and brake 5 for seventh gear. For the reverse gear, brake 04 and clutch 15 are closed.

The spatial arrangement of the shifting elements in the transmission according to the present invention can be any one desired; it is limited only by dimensions and external configuration. In conjunction with a non-coaxial in particular, axially parallel—arrangement of input drive AN and output drive AB of the transmission, clutches 14, 15, 45 are preferably arranged, when viewed radially, above planetary gear sets P1, P2 and P3. In the embodiment shown by way of example in FIG. 1, clutch 45 is arranged, when viewed radially, slightly above the first (input-drive-side) planetary gear set P1, and closer thereto than clutches 14 and 15. The inner disc carrier of clutch 45 is preferably arranged on the output drive side; a servo device (not depicted, for simplification) of clutch 45 can be arranged between the disc packet and the outer disc carrier. The outer disc carriers of clutches 14 and 15 are preferably also arranged on the input drive side.

Figures 3, 4:
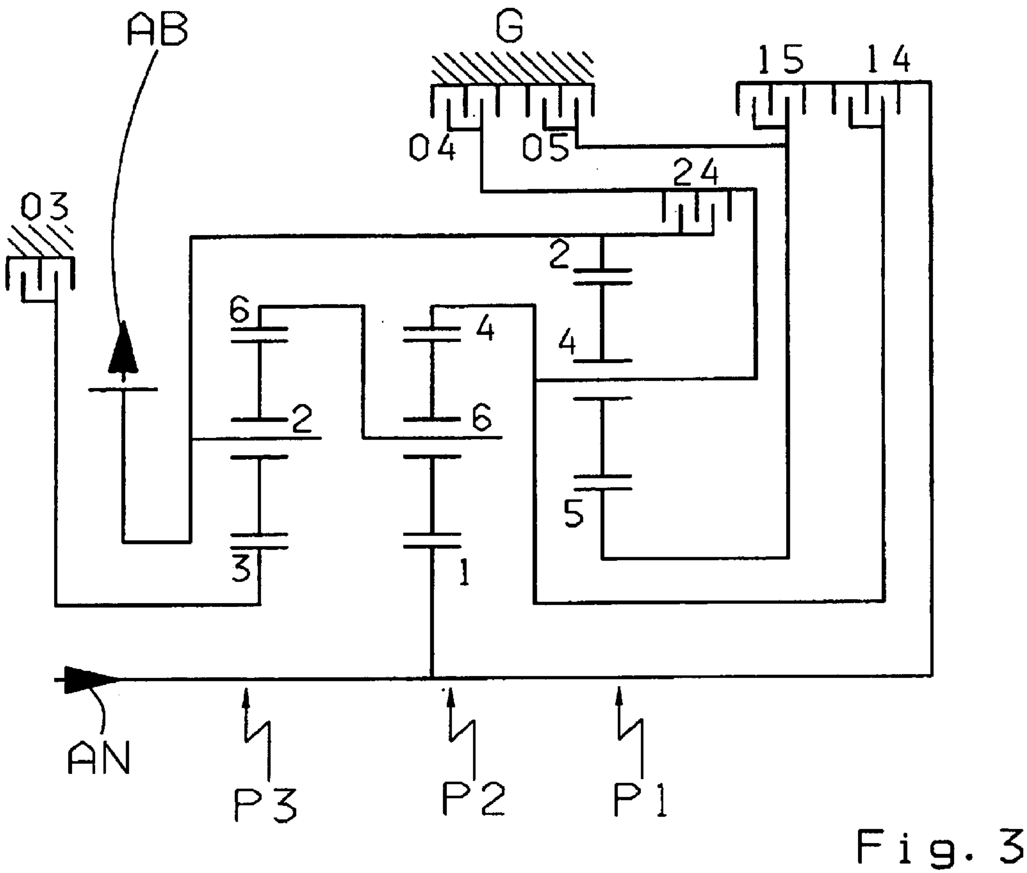
FIG. 3 is schematically depicts a second embodiment of a transmission according to the present invention.
FIG. 4 shows, by way of example, a shifting diagram for the transmission depicted in FIG. 2.

The transmission configuration as depicted in FIG. 3 corresponds substantially to the embodiment shown in FIG. 1, with the difference that shaft 4 is releasably connectable to drive shaft 2, via clutch 24, in a region between brake 04 and the carrier of first planetary gear set P1. In this embodiment, the inner disc carrier of clutch 24 is preferably arranged on the output drive side.

It is also clearly evident from FIG. 3 that by simultaneously closing brake 04 and clutch 24: it is easy to constitute a so-called "hill holder" for the transmission, with which output drive shaft 2 of the transmission can be locked toward housing G.

FIG. 4 depicts a shifting diagram of the multiple-ratio transmission according to the present invention shown in FIG. 3. The only difference as compared with the shifting diagram shown in FIG. 2 is that instead of clutch 45, clutch 24 is provided and actuated (third gear).

For the first five speeds, brake 03 is continuously activated; in addition, brake 04 is closed for first gear, brake 05 for second gear, clutch 24 for third gear, clutch 15 for fourth gear, and clutch 14 for fifth gear. Clutches 14 and 15 must be closed for sixth gear, and clutch 14 and brake 5 for seventh gear. For reverse gear, brake 04 and clutch 15 are closed.

While the two embodiments according to the present invention described above each show an axially parallel arrangement of input drive AN and output drive AB of the transmission, a description will now be given, for each of the two embodiments, of a variant component arrangement in which input drive AN and output drive AB are arranged coaxially with one another.

Figure 5:
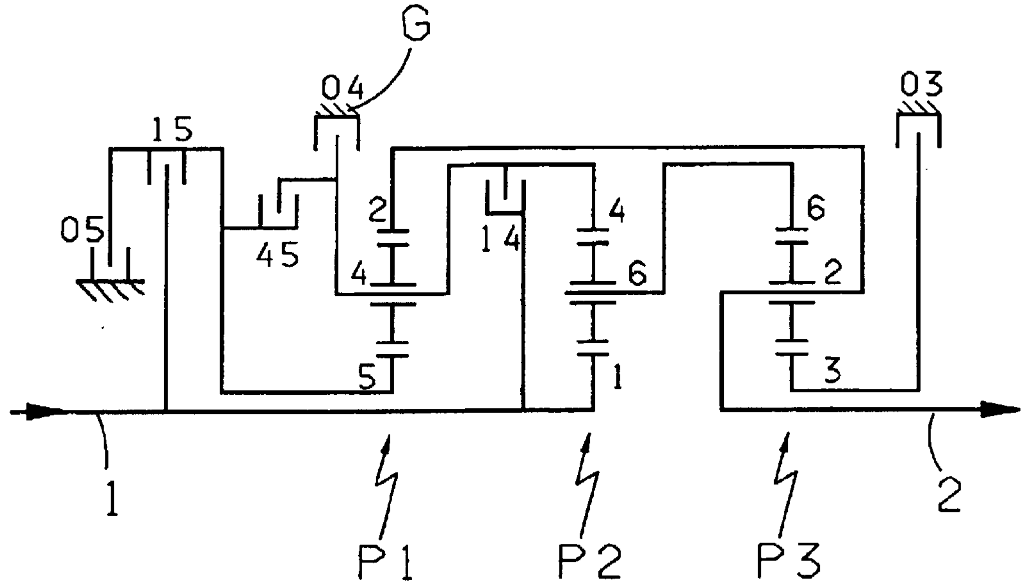
FIG. 5 is schematically depicts a variant component arrangement for the transmission depicted in FIG. 1.

FIG. 5 schematically depicts an example of a variant component arrangement for the transmission depicted in FIG. 1. The kinematic coupling of the three planetary gear sets P1, P2, P3 and the six shifting elements 03, 04, 05, 14, 15, 24 is thus carried over without change from FIG. 1. As already mentioned, in contrast to FIG. 1 input drive AN and output drive AB of the transmission now run coaxially with one another. Input drive AN of the transmission is therefore arranged on the side of first planetary gear set P1 facing away from the second (middle) planetary gear set P2, and output drive AB of the transmission is located on the side of the transmission opposite input drive AN, i.e. on the side of third planetary gear set P3 facing away from the second (middle) planetary gear set P2. Clutch 14, with which shaft 4 is connectable to input drive shaft 1, is now arranged axially between the two planetary gear sets P1 and P2. The other two clutches 15 and 45, and also the two brakes 04 and 05, are arranged on the input drive side of the transmission, i.e. on the side of first planetary gear set P1 facing away from middle planetary gear set P2. Brake 05 is arranged adjacent to the input-drive-side outer wall of housing G. The two clutches 15 and 45 are arranged adjacent to one another, clutch 45 being arranged closer to planetary gear set P1 than is clutch 15. In the example depicted in FIG. 5, clutch 45 and brake 04 are arranged in three-dimensional terms adjacent to first planetary gear set P1.

In another embodiment of the component arrangement, provision can also be made, for example, for brake 04 to be arranged in three-dimensional terms in a region radially above the planetary gear sets, in particular radially above first planetary gear set P1. Clutch 45 can also be arranged below brake 04 (viewed in the radial direction). In yet another embodiment of the component arrangement, clutches 15 and 45 can also be grouped together as a pre-assemblable subassembly having one common disc carrier. Clutch 15 can also be arranged in three-dimensional terms radially above brake 05, or brake 05 (e.g. in the form of a band brake) can be arranged in three-dimensional terms radially above clutch 15.

One skilled in the art can adapt the three-dimensional arrangement of the respective shifting elements to the installation space available for the transmission in the motor vehicle.

Figure 6:
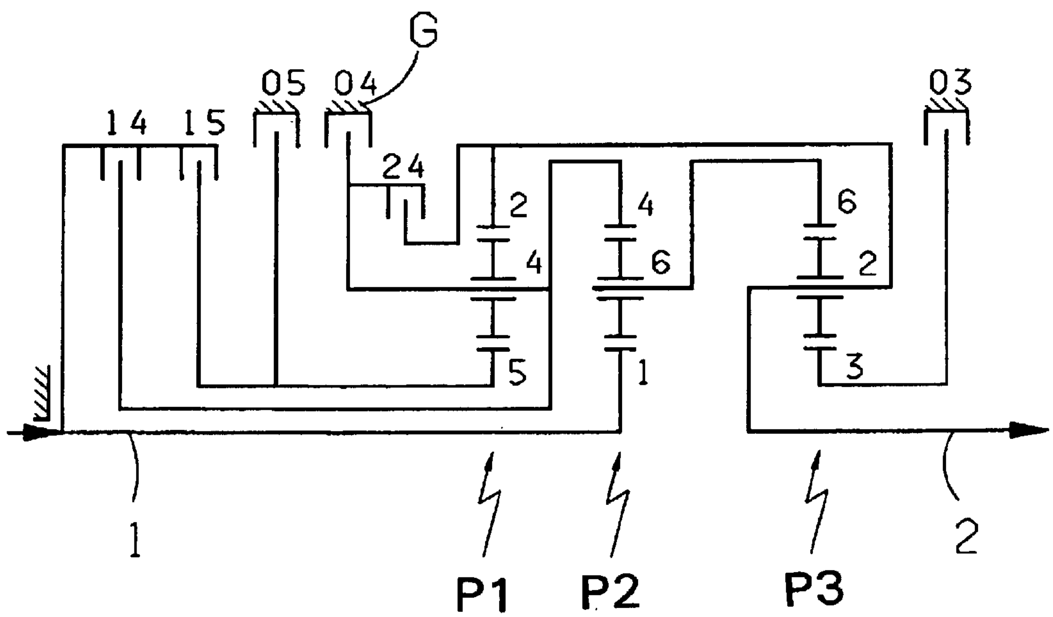
FIG. 6 schematically depicts a variant component arrangement for the transmission depicted in FIG. 3.

Lastly, FIG. 6 schematically depicts an example of a variant component arrangement for the transmission depicted in FIG. 3. The kinematic coupling of the three planetary gear sets P1, P2, P3 and the six shifting elements 03, 04, 05, 14, 15, 24 is thus carried over without change from FIG. 3. As already mentioned, in contrast to FIG. 3 input drive AN and output drive AB of the transmission run coaxially with one another. In addition, all the shifting elements (04, 05, 14, 15, 24) with the exception of brake 03 are now arranged on the input drive side of the transmission, i.e. on the side of first planetary gear set P1 that is located opposite second planetary gear set P2. Clutch 24, with which output drive shaft 2 is additionally connectable to shaft 4, is adjacent to first planetary gear set P1. The two clutches 14 and 15, in particular their disc packets, are arranged next to one another, clutch 14 being adjacent to the input-drive-side outer wall of housing G. The two clutches 14, 15 can also be grouped together as a pre-assemblable subassembly, in particular having one common disc carrier. In another embodiment, provision can also be made, for example, for the two clutches 14, 15 to be arranged nested one inside another, clutch 14 being arranged completely inside a clutch space that is formed by the common disc carrier for both clutches 14, 15. The discs of clutch 15 can be arranged in three-dimensional terms radially above the discs of clutch 14, but also axially next to the, discs of clutch 14. Brakes 04 and 05, arranged axially between the two clutches 15 and 24 in the example of FIG. 6, can also, in a different component arrangement configuration, be arranged in three-dimensional terms radially above the planetary gear sets.

In all embodiments of the transmission according to the present invention, freewheels can additionally be inserted at any point in the transmission, e.g. between a shaft and the housing or between two shafts in order to divide a shaft in two. For example, a freewheel additionally inserted between shaft 3 and housing G serves to assist brake 03, a freewheel additionally inserted between shaft 4 and housing G to assist brake 04, and a freewheel additionally inserted between shaft 5 and housing G to assist brake 05. This insertion of an additional freewheel parallel to a shifting element can be provided, for example, in order to improve shifting smoothness when downshifting (coasting shifts).

In addition, the input drive shaft can be separated from the engine by way of a clutch element; the clutch element can be embodied, for example, as a dry or wet initial movement clutch, a magnetic powder clutch, a centrifugal clutch, a hydrodynamic clutch, etc.

The input drive shaft can furthermore also be separated from the engine by way of a converter element; the latter can be embodied as a hydrodynamic converter, a differential converter, an initial movement retarder, a hydrostatic transmission, an electrical linkage or electromechanical linkage, or the like. This means that an additional conversion ratio stage, having a constant conversion ratio or also a variable ratio greater than or equal to unity, can be provided between the engine and transmission.

Alternatively, an initial movement element can also be arranged after the transmission in the power flow direction, so that the input drive shaft is connected in fixed fashion to the coupling shaft of an engine. In such a case, initial movement is implemented by way of a shifting element of the transmission, e.g. by means of brake 04, which is activated both in the first forward gear and in reverse gear.

In addition, a wear-free brake, for example a hydraulic or electric retarder or the like, can be arranged on each shaft, but preferably on input drive shaft 1 or output drive shaft 2.

It is moreover possible, because of the design according to the present invention, to arrange input drive AN and output drive AB both for transverse, front longitudinal, rear longitudinal, or all-wheel arrangements on the same side of the transmission or of transmission housing G, and for standard input drives on the opposite sides of the transmission or of transmission housing G. An axle differential and/or a center differential can additionally be arranged on the input drive side or the output drive side. Input drive AN and output drive AB of the multiple-ratio transmission according to the present invention can thus be arranged coaxially or non-coaxially (e.g. axially parallel or at an angle) with respect to one another.

A powder takeoff for driving additional accessories can furthermore be provided on any shaft, but preferably on input drive shaft 1 or output drive shaft 2.

The shifting elements themselves advantageously comprise on-load shifting clutches or brakes, such as multi-disc clutches, band brakes, cone clutches, or the like; they can also, however, comprise positive-engagement clutches or brakes, for example dog clutches or synchronizers.

A further advantage of the multiple-ratio transmission presented here is the fact that an electrical machine can additionally be mounted on any shaft as a generator and/or as an additional input drive machine.

Any design embodiment, in particular any three-dimensional arrangement of the planetary gear sets and the shifting elements, of itself and in combination and to the extent technically appropriate, of course also falls within the scope of protection of the present claims without influencing the function of the transmission as recited in the claims, even if those embodiments are not explicitly presented in the Figures or in the description.

Reference numerals

1 Shaft
2 Shaft
3 Shaft
4 Shaft
5 Shaft
6 Shaft
03 Brake
04 Brake
05 Brake
14 Clutch
15 Clutch
24 Clutch
45 Clutch
P1 Planetary gear set
P2 Planetary gear set
P3 Planetary gear set
i Conversion ratio
G Housing
AN Input drive
AB Output drive

What is claimed is:

1. An automatically shiftable motor vehicle transmission of planetary design for a motor vehicle, comprising:

an input drive shaft (1) and an output drive shaft (2) that are arranged in a housing (G);

first, second and third single-carrier planetary gear sets (P1, P2, P3);

third, fourth, fifth and sixth rotatable shafts (3, 4, 5, 6);

a plurality of shifting elements comprising first, second and third brakes (03, 04, 05), and first, second, and third clutches (14, 15, 45) selective engagement of which brings about various conversion ratios between the input drive shaft (1) and output drive shaft (2), so that at least seven forward speeds can be implemented;

the input drive shaft (1) being continuously connected to a sun gear of the second planetary gear set (P2) and being connectable via the first clutch (14) to a carrier of the first planetary gear set (P1) and being connectable via the second clutch (15) to the fifth shaft (5) which is continuously connected to a sun gear of the first planetary gear set (P1) and is couplable via the third brake (05) to the housing (G);

the output drive shaft (2) being continuously connected to a carrier of the third planetary gear set (P3) and to the ring gear of the first planetary gear set (P1);

the third shaft (3) being continuously connected to a sun gear of the third planetary gear set (P3) and being couplable by way of the first brake (03) to the housing (G);

the fourth shaft (4) being continuously connected to a ring gear of the second planetary gear set (P2) and to the carrier of the first planetary gear set (P1), and being directly couplable to the housing (G) through only the second brake (04);

the sixth shaft (6) being continuously connected to a ring gear of the third planetary gear set (P3) and to a carrier of the second planetary gear set (P2); and the third clutch (45) being provided which releasably connects the fourth shaft (4) to one of the fifth shaft (5) and the output drive shaft (2).

2. The automatically shiftable motor vehicle transmission as set forth in claim 1, wherein the fourth shaft (4) is releasably connectable via the third clutch (45), in a region between the second brake (04) and the carrier of the first planetary gear set (P1), to one of the fifth shaft (5) and to the output drive shaft (2).

3. The automatically shiftable motor vehicle transmission as set forth in claim 1, wherein by selective closing of the first, second and third brakes (03, 04, 05), and the first, second and third clutches (14, 15, 45), seven forward speeds can be selected wherein for a shift from one speed into either the next higher or next lower speed, of the shifting elements currently being actuated, only one shifting element is opened and one further shifting element is closed.

4. The automatically shiftable motor vehicle transmission as set forth in claim 1, wherein in a first forward speed the first and second brakes (03, 04) are closed, in a second forward speed the first and third brakes (03, 05) are closed, in a third forward speed the first brake (03) and the third clutch (45) are closed, in a fourth forward speed the first brake (03) and the second clutch (15) are closed, in a fifth forward speed the first brake (03) and the first clutch (14) are closed, in a sixth forward speed the first and second clutches (14, 15) are closed, in a seventh forward speed the third brake (05) and the first clutch (14) are closed, and in a reverse gear the second brake (04) and the second clutch (15) are closed.

5. The automatically shiftable motor vehicle transmission as set forth in claim 1, wherein the first, second and third planetary gear sets (P1, P2, P3) are embodied as minus planetary gear sets.

6. The automatically shiftable motor vehicle transmission as set forth in claim 1, wherein the first, second and third clutches (14, 15, 45) are arranged, when viewed radially, above the first, second and third planetary gear sets (P1, P2, P3).

7. The automatically shiftable motor vehicle transmission as set forth in claim 1, wherein the third clutch (45), when viewed radially, is arranged slightly above the first planetary gear set (P1) and closer thereto than the first and second clutches (14, 15).

8. The automatically shiftable motor vehicle transmission as set forth in claim 1, wherein the second and third clutches (15, 45) are arranged on the side of the first planetary gear set (P1) that lies opposite the second planetary gear set (P2); and the first clutch (14) is arranged axially between the first and second planetary gear set (P1, P2).

9. The automatically shiftable motor vehicle transmission as set forth in claim 1, wherein the first, second and third clutches (14, 15, 24) are arranged on the side of the first planetary gear set (P1) that lies opposite the second planetary gear set (P2).

10. The automatically shiftable motor vehicle transmission as set forth in claim 8, wherein the third clutch (45) is arranged closer to the first planetary gear set (P1) than the second clutch (15).

11. The automatically shiftable motor vehicle transmission as set forth in claim 1, wherein the third clutch (45) is adjacent to the first planetary gear set (P1).

12. The automatically shiftable motor vehicle transmission as set forth in claim 1, wherein the first, second and third clutches are disc clutches, and outer disc carriers of the clutches (14, 15, 24, 45) are arranged on an input drive side of the transmission.

13. The automatically shiftable motor vehicle transmission as set forth in claim 1, wherein the first brake (03) is arranged on a side of the third planetary gear set (P3) that lies opposite the second planetary gear set (P2).

14. The automatically shiftable motor vehicle transmission as set forth in claim 1, wherein at least one of the second brake (04) and the third brake (05) is arranged, when viewed radially, above the planetary gear sets (P1, P2, P3).

15. The automatically shiftable motor vehicle transmission as set forth in claim 14, wherein the third brake (05) is arranged closer to the first planetary gear set (P1) than the second brake (04).

16. The automatically shiftable motor vehicle transmission as set forth in claim 14, wherein the third clutch (45) is arranged axially between the third brake (05) and the second clutch (15).

17. The automatically shiftable motor vehicle transmission as set forth in claim 1, wherein at least one of the second brake (04) and the third brake (05) is arranged on a side of the first planetary gear set (P1) that lies opposite the second planetary gear set (P2).

18. The automatically shiftable motor vehicle transmission as set forth in claim 17, wherein the second brake (04) is arranged closer to the first planetary gear set (P1) than the third brake (05).

19. The automatically shiftable motor vehicle transmission as set forth in claim 1, wherein the second and third clutches (15, 45) are arranged adjacent to one another.

20. The automatically shiftable motor vehicle transmission as set forth in claim 1, wherein at least one additional freewheel is provided between one of the input, output, third, fourth, fifth and sixth shafts (1, 2, 3, 5, 6) and the housing (G).

21. The automatically shiftable motor vehicle transmission as set forth in claim 1, wherein an input drive (AN) and an output drive (AB) of the transmission are arranged coaxially with one another.

22. The automatically shiftable motor vehicle transmission as set forth in claim 1, wherein an input drive (AN) and an output drive (AB) of the transmission are not arranged coaxially with one another such that the input drive (AN) and output drive (AB) extend one of axially parallel and at an angle to one another.

23. The automatically shiftable motor vehicle transmission as set forth in claim 21, wherein the input drive (AN) and output drive (AN) are provided on the same side of the housing (G).

24. The automatically shiftable motor vehicle transmission as set forth in claim 1, wherein one of an axial differential and a center differential is arranged on one of an input drive side and an output drive side of the transmission.

25. The automatically shiftable motor vehicle transmission as set forth in claim 1, wherein the input drive shaft (1) is separable from a drive engine by way of one of a clutch element and a conversion element.

26. The automatically shiftable motor vehicle transmission as set forth in claim 25, wherein the conversion element or clutch element is one of a hydrodynamic converter, a differential converter, an initial movement retarder, a hydrostatic transmission, an electric transmission, an electromechanical transmission, or a hydrodynamic clutch, a dry initial movement clutch, a wet initial movement clutch, a magnetic powder clutch, and a centrifugal clutch.

27. The automatically shiftable motor vehicle transmission as set forth in claim 1, wherein an initial movement element can be arranged after the transmission in the power flow direction, the input drive shaft (1) being connected in fixed fashion to the crankshaft of the engine.

28. The automatically shiftable motor vehicle transmission as set forth in claim 27, wherein initial movement is accomplished by means of the second brake (04) integrated into the transmission.

29. The automatically shiftable motor vehicle transmission as set forth in claim 1, wherein the third clutch (24) with which the second shaft (4) is connectable to the output drive shaft (2) constitutes, together with the second brake (04), a hill holder for the transmission in order to immobilize the output drive shaft (2) on the housing (G).

30. The automatically shiftable motor vehicle transmission as set forth in claim 1, wherein a wear-free brake can be arranged on each shaft.

31. The automatically shiftable motor vehicle transmission as set forth in claim 1, wherein a power takeoff can be arranged on each shaft in order to drive additional accessories.

32. The automatically shiftable motor vehicle transmission as set forth in claim 31, wherein an input drive (AN) of the transmission and the power takeoff are arranged on the same side of the transmission or of the housing (G).

33. The automatically shiftable motor vehicle transmission as set forth in claim 1, wherein the shifting elements (03, 04, 05, 14, 15, 45, 24) are embodied as on-load shifting clutches or brakes.

34. The automatically shiftable motor vehicle transmission as set forth in claim 33, wherein disc clutches, band brakes, and/or cone clutches are usable.

35. The automatically shiftable motor vehicle transmission as set forth in claim 1, wherein an electrical machine can additionally be mounted on any shaft as at least one of a generator and an additional input drive machine.

* * * * *